Figure 1:
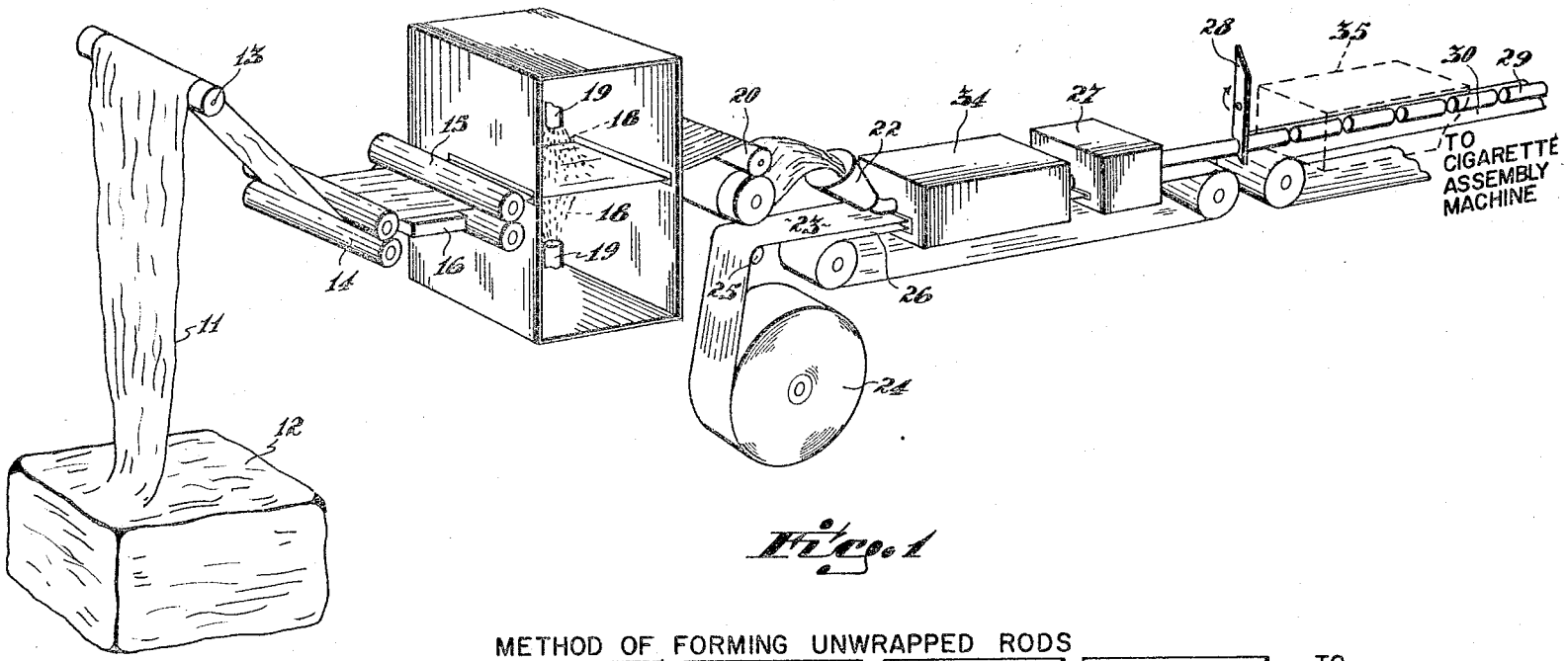
Figure 2:
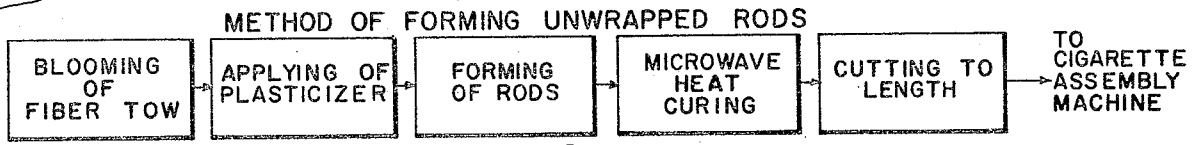
Figure 3:
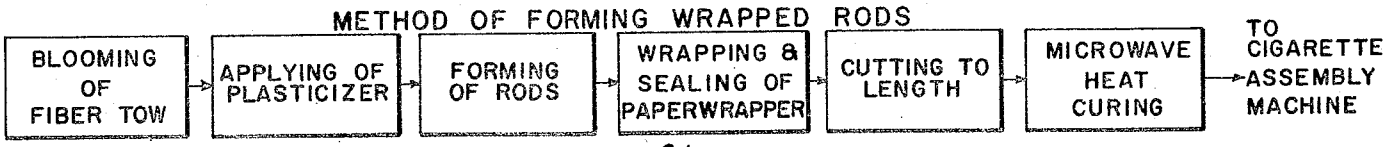
Figure 4:
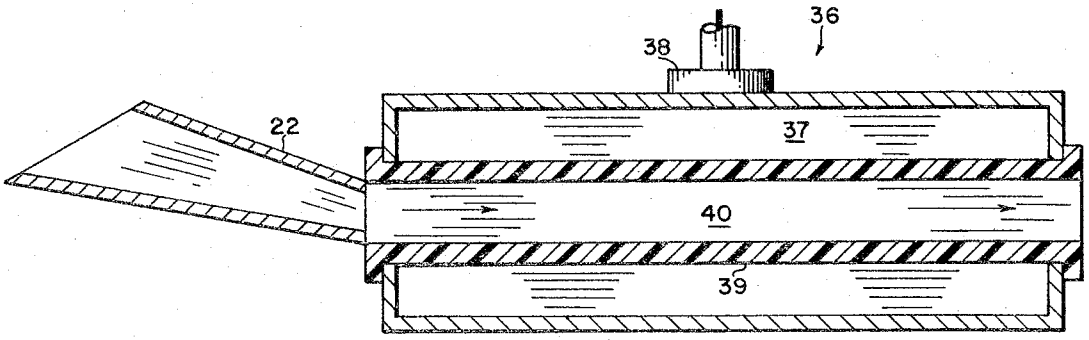
Figure 5:
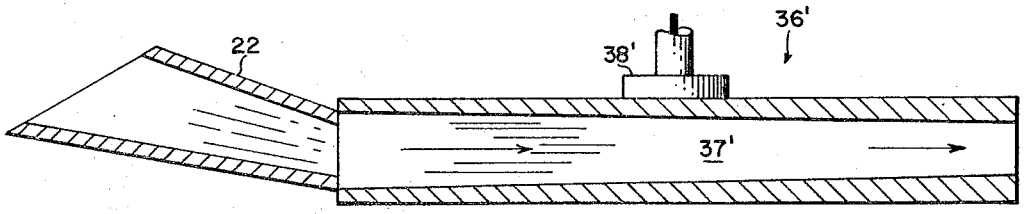

T 860,010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 679

666,165

METHOD FOR FORMING CIGARETTE FILTER RODS

John R. Hatfield, Jr., and Charles E. Sandidge, both of P.O. Box 511, Kingsport, Tenn. 37662

Filed Sept. 7, 1967. Published Mar. 18, 1969

Class 156—166

2 Sheets Drawing. 15 Pages Specification

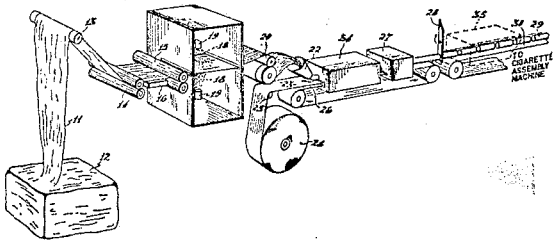

A method and apparatus for forming cigarette filter rods that includes the step of heating the filter rod fibers and/or plasticizer by microwave energy to cause rapid and even curing of the rods. The microwave energy may be applied to the filter rod fibers either immediately after the tow material is formed, simultaneously with the forming, or after the rod-like configuration of plasticizer containing tow material is wrapped with a wrapper.

T 860,010

March 18, 1969 J. R. HATFIELD, JR., ETAL DEF. PUB.

METHOD FOR FORMING CIGARETTE FILTER RODS SN - 666165

Filed Sept. 7, 1967 Sheet 1 of 2

T 860,010

March 18, 1969 J. R. HATFIELD, JR., ETAL DEF. PUB.

METHOD FOR FORMING CIGARETTE FILTER RODS SN - 666165

Filed Sept. 7, 1967 Sheet 2 of 2